Aug. 27, 1963
J. H. HYLER ETAL
3,101,977
HYDRAULIC TRACK TENSIONING MEANS
Original Filed March 7, 1958
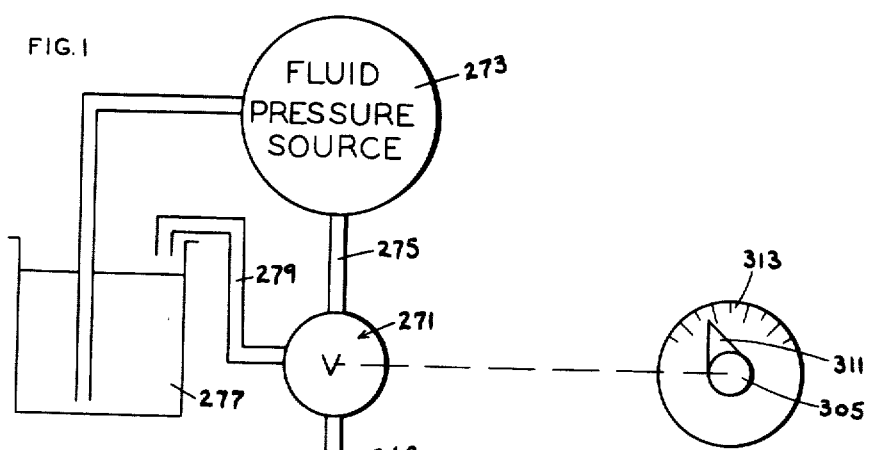
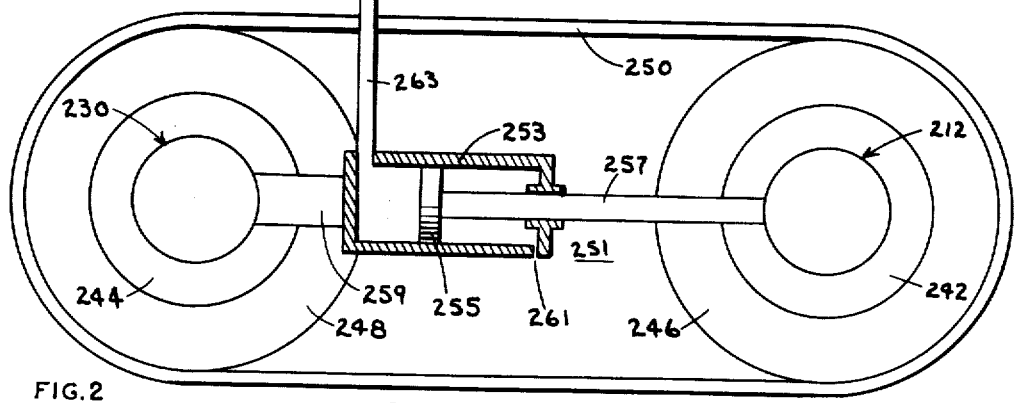
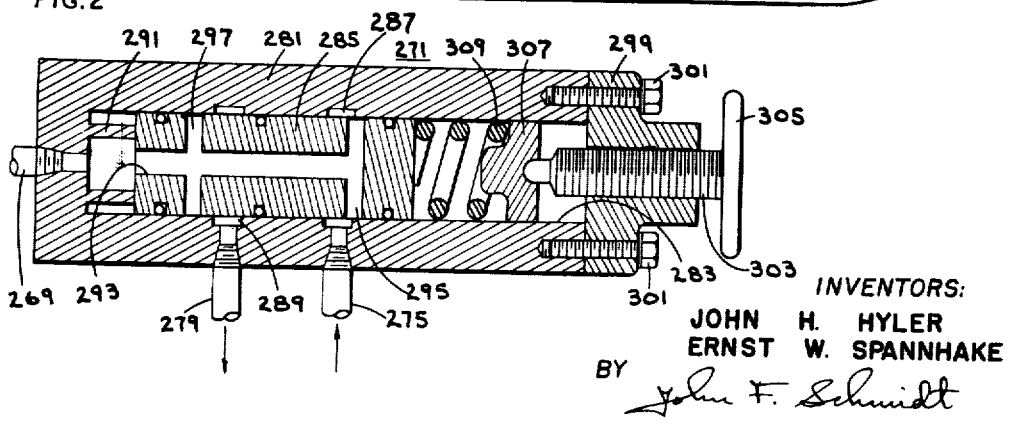
INVENTORS:
JOHN H. HYLER
ERNST W. SPANNHAKE
BY John F. Schmidt

United States Patent Office 3,101,977
Patented Aug. 27, 1963

3,101,977
HYDRAULIC TRACK TENSIONING MEANS
John H. Hyler, Peoria, Ill., and Ernst W. Spannhake, Butler, N.J., assignors to LeTourneau-Westinghouse Company, Peoria, Ill., a corporation of Illinois
Original application Mar. 7, 1958, Ser. No. 719,838, now Patent No. 2,998,998, dated Sept. 5, 1961. Divided and this application Oct. 25, 1960, Ser. No. 64,926
7 Claims. (Cl. 305—10)

This invention relates to a land vehicle, and more especially, to a land vehicle of a type which is adapted to move on pneumatic tires or on a track mounted on the pneumatic tires, at the option of the operator. This application is a division of application Ser. No. 719,838, filed March 7, 1958, now Patent 2,998,998, issued September 5, 1961, and assigned to the assignee of this invention.

There are many places in the construction and earthmoving industry which call for track-laying vehicles capable of negotiating all types of terrain. Such vehicles may have to pass through soft mud one minute and a dry rock-strewn area in the next minute. Such a vehicle must be capable of producing sufficient traction under all of the varied circumstances, and it must moreover be capable of keeping its track or tracks on in spite of rocks, tree branches, or the like which may come between the track and the tires. If the track should happen to break because of the extremely rough usage, it is desirable that the operator be able to take the vehicle back to a repair point under its own power, or even to operate the vehicle under certain conditions without tracks.

It is accordingly an object of this invention to provide a land vehicle which under many operating conditions operates as a track-laying vehicle, the track of the vehicle being under very high tension, controlled or regulated according to the weight of the vehicle, so that the track itself can carry the vehicle load even though the contact points under the wheels often do not touch the ground. It is another object of this invention to provide a vehicle which can operate track-laying or wheeled. Other objects will become apparent to those skilled in the art from a study of the following description and the accompanying drawings.

In the drawings:

FIG. 1 is a diagrammatic or schematic side elevation view illustrating a vehicle embodying the invention; and FIG. 2 is a view in section showing details of a valve used in the embodiment of FIG. 1.

Referring now in detail to the drawings, in FIG. 1 we have shown schematically an embodiment of the invention. In that figure, a side elevation view of the wheels and a simplified track are shown. More specifically, wheels 242 and 244 are shown on axles 212 and 230 respectively, and equipped with pneumatic tires 246 and 248.

Axle 230 is mounted for limited movement relative to axle 212, and this mounting may be by any suitable means which need not be detailed here. A flexible band track 250 tightly engages the tires 246 and 248 and is kept tight by means which bias the axles apart in accordance with the vehicle load. As here shown, these means consist of a hydraulic jack 251 connected to the axles and kept under suitable pressure.

More specifically, jack 251 consists of a cylinder member 253 and a piston member 255 reciprocable therein and connected with a piston rod 257. Cylinder member 253 is connected by any suitable means 259 with axle 230, and piston rod 257 is suitably connected with axle 212. As shown, the jack 251 is of the single-acting type, being vented on the atmospheric pressure side of the piston as shown at 261. The other end of the cylinder is connected with one end of a conduit 263. Conduit 263 connects at its other end with a T 265 which in turn taps into the liquid chamber of an oleopneumatic pressure device of the general type shown in Reissue Patent 23,437 and here shown at 267. The other branch of the T connects with a conduit 269 which in turn is connected with a valve 271.

By means of a conduit 275, valve 271 is supplied with fluid under pressure from a suitable source 273 which includes a reservoir 277. A suitable conduit 279 is connected to return liquid from valve 271 to the reservoir.

Valve 271 is shown in detail in FIG. 2. As there shown, a body member 281 is provided with a substantially central bore 283 in which a valve spool 285 is slidably disposed.

The valve body 281 is provided with annular grooves communicating with the central bore and with conduits 275 and 279. As shown, an annular groove 287 communicates with conduit 275 and a similar annular groove 289 communicates with conduit 279. A suitable projection 291 is provided at one end of the bore for the accurate location of spool 285 at one limit of its travel.

Spool 285 is provided with a central bore 293 running from the extreme left end of the spool to a cross bore 295 which is spaced from the right end of the spool. Another cross bore 297 communicates with the central bore and is disposed between the left end of the spool and the bore 295. The spacing of the cross bores 295 and 297 is related to annular grooves 287 and 289 in such a way that, with the valve spool at the leftward limit of its travel, the ends of cross bore 295 are partially uncovered by annular groove 287 and movement of spool 285 to the right gradually shuts off the communication of cross bore 295 with annular groove 287. Cross bore 297, in the extreme leftward position of spool 285, is blocked by the surface of bore 283 in valve body 281. However, after valve spool 285 has moved to the right sufficiently to block the ends of cross bore 295, the ends of cross bore 297 are uncovered by the annular groove 289. It will of course be appreciated by those skilled in the art that the ends of cross bore 295 will be closed before the ends of cross bore 297 are uncovered. Valve body 281 is provided at its right end with a closure 299 which may be secured to the valve body in any suitable manner as for example by the threaded means 301. The closure member 299 has a substantially central threaded opening adapted to receive a similarly threaded screw 303. At its outer end, screw 303 has secured to it a suitable hand wheel 305. The other end of screw 303 engages a spring seat 307. A spring 309 is compressed between spring seat 307 and the right end of valve spool 285.

As is best seen in FIG. 1, this form of the invention in its preferred embodiment is arranged to provide a pointer 311 on the hand wheel 305. Pointer 311 cooperates with a suitably calibrated scale 313. As will be understood by those skilled in the art, scale 313 will be mounted so as to be stationary relative to the valve body 281. It will also be evident from the foregoing that pointer 311 and scale 313 together constitute an indicator.

The scale 313 may be calibrated in any units desired. In a preferred form of the invention, the scale could be calibrated in terms of vehicle load.

*Operation*

Track 250 operates under a very high tension, such that if the vehicle runs over a log or other projection engaged by the track midway between wheels 242 and 244, notwithstanding any appreciable deflection of track 250 that may occur, the track itself supports the weight of the vehicle without those portions of the track under the wheels being in contact with the ground.

Notwithstanding the high tension in the track, the combination of track and tires is nevertheless sufficiently yielding to permit foreign objects such as sizable branches, rocks, and the like, to find their way between the track and the pneumatic tires and to work their way around without throwing the track off the wheels.

Moreover, the tension in the track is great enough to drive the track in every kind of terrain, even in mud, because the tension is such that mud which would be soft enough to make the track slippery is simply squeezed out, while mud of a heavier consistency at first packs under the tires but can then be stripped off by suitable baffles (not shown) and thrown to one side.

If for some reason the track should break, the vehicle can be operated on its rubber tires, in which case the jack 251 is extended, either all the way or until the system comes against a suitable stop (not shown).

The system will be charged with fluid under pressure in a manner which will be well understood by those skilled in the art and which need not be detailed here. If, in order to compensate for a heavier vehicle load, a higher track tension is desired, the operator turns the hand wheel 305 until the pointer indicates the load, or such other unit in terms of which the scale 313 is calibrated. Assuming that the threaded member 303 is provided with a right hand thread, turning the hand wheel 305 clockwise as seen from the right end of FIG. 2 will tighten up or increase the compression of spring 309. The increased pressure will force valve spool 285 leftward to register the ends of cross bore 295 with the annular groove 287. Fluid under pressure will then be communicated from the fluid pressure source 273 to the accumulator 267 and the cylinder 253 by way of conduit 275, annular groove 287, cross bore 295, central bore 293, conduit 269, T 265 and conduit 263. The increase in pressure will compress the air in accumulator 267 sufficiently to establish the higher pressure in the accumulator. The higher pressure is of course also transmitted to cylinder 253 and serves to bias the axles 212 and 230 apart with a greater force than was present before hand wheel 305 was turned. Even though there may be no appreciable separation of axles 212 and 230, the force tending to push them apart will be increased and this will increase the tension on the band track 250. With the increasing tension, the band track will again be able to operate to secure the advantages set forth above in the discussion of the desirability of maintaining the track tension at a high level.

As the vehicle rolls over the terrain, the track is maintained under tension by a substantially constant force, by means of jack 251 and its connection with accumulator 267. As is well understood by those skilled in the art, any amount of fluid displacement in a finite accumulator will result in variations in fluid pressure in the system and thus in variations in the track tension. However, by selecting an accumulator which has a large capacity relative to the rest of the hydraulic system, a vehicle can be designed in which even a large variety of terrain conditions can be negotiated without reducing the track tension enough to induce slipping of the wheels in the track or increasing tension enough to put intolerable loads on bearings, track, tires, etc. Within the limits of such considerations, track tension would be maintained by a "substantially" constant force.

If now the load on the vehicle is lightened, and the operator desires to diminish track tension in order to reduce the wear on bearings, on the track itself, and the like, the operator turns the hand wheel 305 counter-clockwise by the indicated amount, thus reducing the compressive forces on spring 309. This unbalance in the system and the pressure in conduits 263 and 269 is sufficient to shift valve spool 285 to the right until cross bore 297 registers with annular groove 289. Some liquid under pressure is thereupon bled out of the system through the valve by way of central bore 293, cross bore 297, and waste conduit 279, to the reservoir 277. Liquid bleeds out until the system is again substantially in balance, whereupon the mechanism is in a new state of equilibrium in accordance with the new load. Once again the accumulator 267 serves to maintain the system under a substantially constant pressure which is somewhat lower than the pressure in the system before hand wheel 305 was turned counter-clockwise.

It will be clear from the foregoing that the illustrated invention provides a land vehicle of a track-laying type which may operate in all types of terrain and which may if necessary be operated trackless. It will also be evident from the foregoing that, in the hydraulic system here disclosed and claimed, accumulator 267 is at all times responsive to normal operating pressures and pressure variations in jack 251—i.e., as long as jack 251 is a factor in maintaining track tension, accumulator 267 responds to whatever pressure obtains in jack 251. Other advantages will be apparent to those skilled in the art.

While this application shows one form which the invention may take in practice, it will be understood that this form is shown for purposes of illustration and that the invention may be modified and embodied in various other forms without departing from its spirit or from the scope of the appended claims.

What is claimed is:

1. A track laying vehicle comprising: wheels; resilient tires on the wheels; at least one flexible band track tightly engaging at least two wheels; fluid pressure operated means to maintain tension in the track; a source of fluid under pressure; a conduit having a connection with the source; a second conduit for the discharge of spent fluid; a third conduit connected with the fluid pressure operated means; a fluid pressure responsive fluid conducting element having passages and an operating position in which the passages connect the first and third conduits and a second operating position in which the passages connect the first and third conduits and a second operating position in which the passages connect the second and third conduits; means biasing said element against fluid pressure into one of said positions and resisting movement from that position to the remaining one of said positions; and means to vary the resistance of said biasing means.

2. A track laying vehicle comprising: wheels; resilient tires on the wheels; at least one flexible band track tightly engaging at least two wheels; fluid pressure operated means to maintain tension in the track; a source of fluid under pressure; a conduit having a connection with the source; a second conduit for the discharge of spent fluid; a third conduit connected with the fluid pressure operated means; a fluid pressure responsive fluid conducting element having passages and an operating position in which the passages connect the first and third conduits and a second operating position in which the passages connect the second and third conduits; means biasing said element against fluid pressure into the first-named one of said positions and resisting movement from that position to the second-named position; and means to vary the resistance of said biasing means.

3. A track laying vehicle comprising: wheels; resilient tires on the wheels; at least one flexible band track tightly engaging at least two wheels; fluid pressure operated means to maintain tension in the track; a source of fluid under pressure; a conduit having a connection with the source; a second conduit for the discharge of spent fluid; a third conduit connected with the fluid pressure operated means; a fluid pressure responsive fluid conducting element having passages and an operating position in which the passages connect the first and third conduits and a second operating position in which the passages connect the second and third conduits; means biasing said element against fluid pressure into one of said positions and resisting movement from that position to the remaining one of said positions; and operator-operable means, including an indicator calibrated in terms of vehicle load, to vary the resistance of said biasing means in accordance with vehicle load.

4. A track laying vehicle comprising: wheels; resilient tires on the wheels; at least one flexible band track tightly engaging at least two wheels; fluid pressure operated means to maintain tension in the track; a source of fluid under pressure; a conduit having a connection with the source; a second conduit for the discharge of spent fluid; a third conduit connected with the fluid pressure operated means; a fluid pressure responsive fluid conducting element having passages and an operating position in which the passages connect the first and third conduits and a second operating position in which the passages connect the second and third conduits; preloaded elastically deformable means biasing said element against fluid pressure into one of said positions and resisting movement from that position to the remaining one of said positions; and means to vary the resistance of said biasing means.

5. A track laying vehicle comprising: wheels; resilient tires on the wheels; at least one flexible band track tightly engaging at least two wheels; fluid pressure operated means to maintain tension in the track; a source of fluid under pressure; a conduit having a connection with the source; a second conduit for the discharge of spent fluid; a third conduit connected with the fluid pressure operated means; a fluid pressure responsive fluid conducting element having passages and an operating position in which the passages connect the first and third conduits and a second operating position in which the passages connect the second and third conduits; preloaded elastically deformable means biasing said element against fluid pressure into one of said positions and resisting movement from that position to the remaining one of said positions; and operator operable means, including an indicator calibrated in terms of vehicle load, to vary the resistance of said biasing means in accordance with vehicle load.

6. A track laying vehicle comprising: wheels; resilient tires on the wheels; at least one flexible band track tightly engaging at least two wheels; fluid pressure operated means to maintain tension in the track; a source of fluid under pressure; a conduit having a connection with the source; a second conduit for the discharge of spent fluid; a third conduit connected with the fluid pressure operated means; a fluid pressure responsive fluid conducting element having passages and an operating position in which the passages connect the first and third conduits and a second operating position in which the passages connect the second and third conduits; preloaded elastically deformable means biasing said element against fluid pressure into one of said positions and resisting movement from that position to the remaining one of said positions; and means, including an indicator calibrated in terms of vehicle load, to vary the amount that the deformable means is preloaded.

7. A track laying vehicle comprising: wheels; resilient tires on the wheels; at least one flexible band track tightly engaging at least two wheels; fluid pressure operated means to maintain tension in the track; an accumulator connected to the fluid pressure operated means and responsive to all normal operating pressure variations therein; a source of fluid under pressure; a reservoir connected with the source; a conduit having a connection with the source; a second conduit connected with the reservoir; a third conduit connected with the accumulator and the fluid pressure operated means; a fluid pressure responsive fluid conducting element having passages and an operating position in which the passages connect the first and third conduits and a second operating position in which the passages connect the second and third conduits; means biasing said element against fluid pressure into one of said positions and resisting movement from that position to the remaining one of said positions; and means to vary the resistance of said biasing means.

References Cited in the file of this patent
UNITED STATES PATENTS

| | | |
|---|---|---|
| 2,452,671 | Merrill | Nov. 2, 1948 |
| 2,719,062 | Arps | Sept. 27, 1955 |
| 2,837,378 | Williams et al. | June 3, 1958 |
| 2,837,379 | Selyem et al. | June 3, 1958 |
| 2,962,002 | Hayner | Nov. 29, 1960 |
| 2,964,023 | Meulendyk | Dec. 13, 1960 |

UNITED STATES PATENT OFFICE

CERTIFICATE OF CORRECTION

Patent No. 3,101,977                          August 27, 1963

John H. Hyler et al.

It is hereby certified that error appears in the above numbered patent requiring correction and that the said Letters Patent should read as corrected below.

Column 4, lines 35 to 37, strike out "and a second operating position in which the passages connect the first and third conduits".

Signed and sealed this 31st day of March 1964.

(SEAL)
Attest:
ERNEST W. SWIDER

Attesting Officer

EDWARD J. BRENNER

Commissioner of Patents